(12) United States Patent
Stoev et al.

(10) Patent No.: US 7,375,926 B1
(45) Date of Patent: May 20, 2008

(54) INDUCTIVE WRITER DESIGN USING A SOFT MAGNETIC PEDESTAL HAVING A HIGH MAGNETIC SATURATION LAYER

(75) Inventors: Kroum S. Stoev, Pleasanton, CA (US);
Francis H. Liu, Fremont, CA (US);
Yugang Wang, Milpitas, CA (US);
Yingjian Chen, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 11/779,785

(22) Filed: Jul. 18, 2007

Related U.S. Application Data (63) Continuation of application No. 10/741,856, filed on Dec. 19, 2003, now Pat. No. 7,310,204.

(51) Int. Cl.
*G11B 5/187* (2006.01)
(52) U.S. Cl. .................................................. 360/126
(58) Field of Classification Search ................. 360/126
See application file for complete search history.

(56) References Cited

U.S. PATENT DOCUMENTS

| | | | |
|---|---|---|---|
| 5,920,449 A | 7/1999 | Tagawa | |
| 5,935,644 A | 8/1999 | Heim et al. | |
| 5,991,126 A | 11/1999 | Hayashi et al. | |
| 6,043,960 A | 3/2000 | Chang et al. | |
| 6,074,566 A | 6/2000 | Hsiao et al. | |
| 6,104,576 A | 8/2000 | Santini | |
| 6,105,238 A | 8/2000 | Chesnutt et al. | |
| 6,111,724 A | 8/2000 | Santini | |
| 6,118,629 A | 9/2000 | Huai et al. | |
| 6,122,144 A | 9/2000 | Chang et al. | |
| 6,130,809 A | 10/2000 | Santini | |
| 6,156,375 A | 12/2000 | Hu et al. | |
| 6,163,436 A | 12/2000 | Sasaki et al. | |
| 6,172,848 B1 | 1/2001 | Santini | |
| 6,181,514 B1 | 1/2001 | Santini et al. | |
| 6,191,916 B1 | 2/2001 | Sasaki | |
| 6,278,591 B1 | 8/2001 | Chang et al. | |
| 6,304,414 B1 | 10/2001 | Crue, Jr. et al. | |
| 6,317,291 B1 | 11/2001 | Iwai et al. | |
| 6,327,116 B1 | 12/2001 | Watanabe et al. | |
| 6,333,841 B1 | 12/2001 | Sasaki | |
| 6,335,846 B1 | 1/2002 | Gaud et al. | |
| 6,337,783 B1 | 1/2002 | Santini | |

(Continued)

*Primary Examiner*—Jefferson Evans
(74) *Attorney, Agent, or Firm*—Jonathan E. Prejean, Esq.; Mark A. Lauer, Esq.

(57) ABSTRACT

A magnetic head for writing information on a relatively-moving medium includes a first substantially flat soft magnetic pole layer and a second substantially flat pole layer with at least one coil layer between them. The pole layers are magnetically coupled in a core region and spaced by more than one micron from one other. A soft magnetic pedestal adjoins the first pole layer adjacent to a medium-facing surface of the head, and a first high magnetic saturation layer adjoins the pedestal. A second high magnetic saturation layer adjoins the second pole layer. The first high magnetic saturation layer has a first throat height and the second high magnetic saturation layer extends from the medium-facing surface only to a second throat height. The first and second throat heights are within about one and one-half microns from the medium-facing surface and are essentially equal.

16 Claims, 6 Drawing Sheets

U.S. PATENT DOCUMENTS

| | | |
|---|---|---|
| 6,339,523 B1 | 1/2002 | Santini |
| 6,373,657 B1 | 4/2002 | Kamijima |
| 6,377,423 B2 | 4/2002 | Dill, Jr. et al. |
| 6,381,093 B2 | 4/2002 | Yoshida et al. |
| 6,396,660 B1 | 5/2002 | Jensen et al. |
| 6,400,525 B1 | 6/2002 | Sasaki et al. |
| 6,400,527 B1 | 6/2002 | Gochou et al. |
| 6,404,605 B2 | 6/2002 | Shiroishi |
| 6,407,885 B1 | 6/2002 | Ahagon et al. |
| 6,407,892 B2 | 6/2002 | Shiroishi |
| 6,414,824 B1 | 7/2002 | Sasaki |
| 6,417,998 B1 | 7/2002 | Crue, Jr. et al. |
| 6,452,743 B1 | 9/2002 | Sasaki |
| 6,466,415 B1 | 10/2002 | Terunuma et al. |
| 6,624,970 B1 | 9/2003 | Sasaki |
| 6,721,138 B1 | 4/2004 | Chen et al. |
| 6,775,902 B1 | 8/2004 | Huai et al. |
| 6,801,393 B2 | 10/2004 | Oki et al. |
| 6,851,178 B2 | 2/2005 | Han et al. |
| 6,912,106 B1 | 6/2005 | Chen et al. |
| 6,940,689 B2 | 9/2005 | Sasaki et al. |
| 6,965,495 B2 | 11/2005 | Sato et al. |
| 6,977,796 B2 * | 12/2005 | Sasaki et al. .......... 360/123.33 |
| 6,989,964 B2 | 1/2006 | Hsu et al. |
| 7,002,776 B2 * | 2/2006 | Sasaki .................. 360/125.42 |
| 7,009,812 B2 | 3/2006 | Hsu et al. |
| 7,016,149 B2 | 3/2006 | Kutsuzawa et al. |
| 7,046,480 B2 | 5/2006 | Sasaki et al. |
| 7,060,207 B2 | 6/2006 | Sasaki et al. |
| 7,101,633 B2 * | 9/2006 | Yamaguchi et al. ..... 428/815.2 |
| 7,239,479 B2 * | 7/2007 | Sasaki et al. .......... 360/125.33 |

\* cited by examiner

INDUCTIVE WRITER DESIGN USING A SOFT MAGNETIC PEDESTAL HAVING A HIGH MAGNETIC SATURATION LAYER

CROSS-REFERENCE TO RELATED APPLICATIONS

This application is a continuation of U.S. patent application Ser. No. 10/741,856, filed on Dec. 19, 2003, incorporated by reference in its entirety.

BACKGROUND

The present invention relates to inductive magnetic transducers, which may for example be employed in information storage systems or measurement and testing systems.

Inductive heads used for writing and/or reading magnetic information on storage media such as a disk or tape typically include electrically conductive coil windings encircled by a magnetic core including first and second pole layers. Portions of the pole layers adjacent the media are termed pole tips. The magnetic core is interrupted by a submicron nonmagnetic gap disposed between the pole tips to divert magnetic flux to the media during writing. To write to the media electric current is flowed through the coil, which produces magnetic flux in the core encircling the coil windings, the magnetic flux fringing across the nonmagnetic gap adjacent to the media so as to write bits of magnetic field information in tracks on the media.

The first pole layer may also serve as a magnetic shield layer for a magnetoresistive (MR) sensor that has been formed prior to the pole layers, the combined MR and inductive transducers termed a merged or piggyback head. Typically the first pole layer is substantially flat and the second pole layer is curved, as a part of the second pole layer is formed over the coil windings and insulation disposed between the pole layers, while another part nearly adjoins the first pole layer adjacent the gap. The second pole layer may also diverge from a flat plane by curving to meet the first pole layer in a region distal to the media-facing surface, sometimes termed the back gap region, although typically a nonmagnetic gap in the core does not exist at this location.

The curvature of the second pole layer from planar affects the performance of the head. An important parameter of the head is the throat height, which is the distance from the media-facing surface to where the first and second pole layers begin to diverge and become separated by more than the submicron nonmagnetic gap. Because less magnetic flux crosses the gap as the pole layers are further separated, a short throat height is desirable in obtaining a fringing field for writing to the media that is a significant fraction of the total flux crossing the gap.

In addition to the second pole layer being curved from planar, one or both pole layers may also have a tapered width in the pole tip area, to funnel flux through the pole tips. A place where the second pole layer begins to widen is sometimes termed a nose or flare point. The distance to the flare point from the media-facing surface, sometimes called the nose length, also affects the magnitude of the magnetic field produced to write information on the recording medium, due to decay of the magnetic flux as it travels down the length of the narrow second pole tip. Thus, shortening the distance of the flare point from the media-facing surface would also increase the flux reaching the recording media.

Unfortunately, the aforementioned design parameters require a tradeoff in the fabrication of the second pole tip. The second pole tip should be narrow and well-defined in order to produce narrow and well-defined written tracks on the rotating disk, but the slope of the second pole layer at the end of the throat height makes photolithography difficult. The second pole layer can be formed in two pieces to better define the pole tip; a flat pole tip layer and a curved yoke layer that are connected or stitched together. This solution, however, can actually require the throat height to be extended in order to have a sufficient stitched area for flux transfer between the second pole tip and the yoke. High-resolution photolithography, such as I-line or deep ultra violet (DUV) photolithography, may be useful for reducing feature sizes but has a more limited depth of focus that may exacerbate the problem of focusing on the sloped pole layer adjacent the throat.

In addition, several methods are known to form self-aligned pole tips. In one method, an ion beam etch (IBE) or other highly anisotropic process removes a portion of the second pole layer not protected by a mask, thereby creating the second pole tip, with the etching continued to similarly remove a portion of the first pole tip not covered by the second pole tip. The width of the pole tip layers are therefore matched, and walls of the pole tips are aligned, but the problem of accurately defining the second pole tip by photolithography for a short throat height remains. Other proposals include forming an electrically conductive gap layer, so that the second pole tip can be electroplated atop the first. A second pole tip directly plated on a conductive gap layer may have increased eddy currents that counteract high-frequency operation, however, and so has not been widely employed.

High-frequency operation may also be counteracted by self-inductance of the coil that is used to drive the magnetic flux. The number of coil turns may be reduced to reduce the self-inductance, but this generally results in reduced electromotive force. Larger coil cross-sections may be employed, but at high frequencies a skin effect may arise that limits electric current to the surface of the coil cross-sections. Other coil configurations can be employed but typically involve manufacturing difficulties.

SUMMARY

In one embodiment, a magnetic head for writing information on a relatively-moving medium is disclosed, the head having a leading end, a trailing end and a medium-facing surface, the head comprising a first substantially flat soft magnetic pole layer disposed in the head adjacent to the medium-facing surface and extending substantially perpendicular to the medium-facing surface; a second substantially flat soft magnetic pole layer disposed in the head adjacent to the medium-facing surface and oriented substantially parallel to the first pole layer, the second pole layer spaced greater than one micron from the first pole layer and magnetically coupled to the first pole layer in a core region that is removed from the medium-facing surface; a soft magnetic pedestal that adjoins the first pole layer adjacent to the medium-facing surface and is spaced from the second pole layer by a submicron nonferromagnetic gap; and a plurality of coil layers, each of the coil layers including an electrically conductive coil that encircles the core region, each of the coils having at least one coil section that is disposed between the pole layers and between the pedestal and the core region.

In one embodiment, the pedestal includes a high magnetic saturation layer defining a throat height of less than about one and one-half microns. The high magnetic saturation layer may extend further than the throat height from the medium-facing surface. The second pole layer may also include a high magnetic moment layer that extends from the medium-facing surface as far as the throat height, or alternatively extends from the medium-facing surface as far as the core region.

The head may also include a magnetoresistive (MR) sensor that is disposed between the second pole layer and the trailing end, and one of the pole layers may serve as a shield for the sensor.

DETAILED DESCRIPTION OF THE PREFERRED EMBODIMENT

Figure 1:
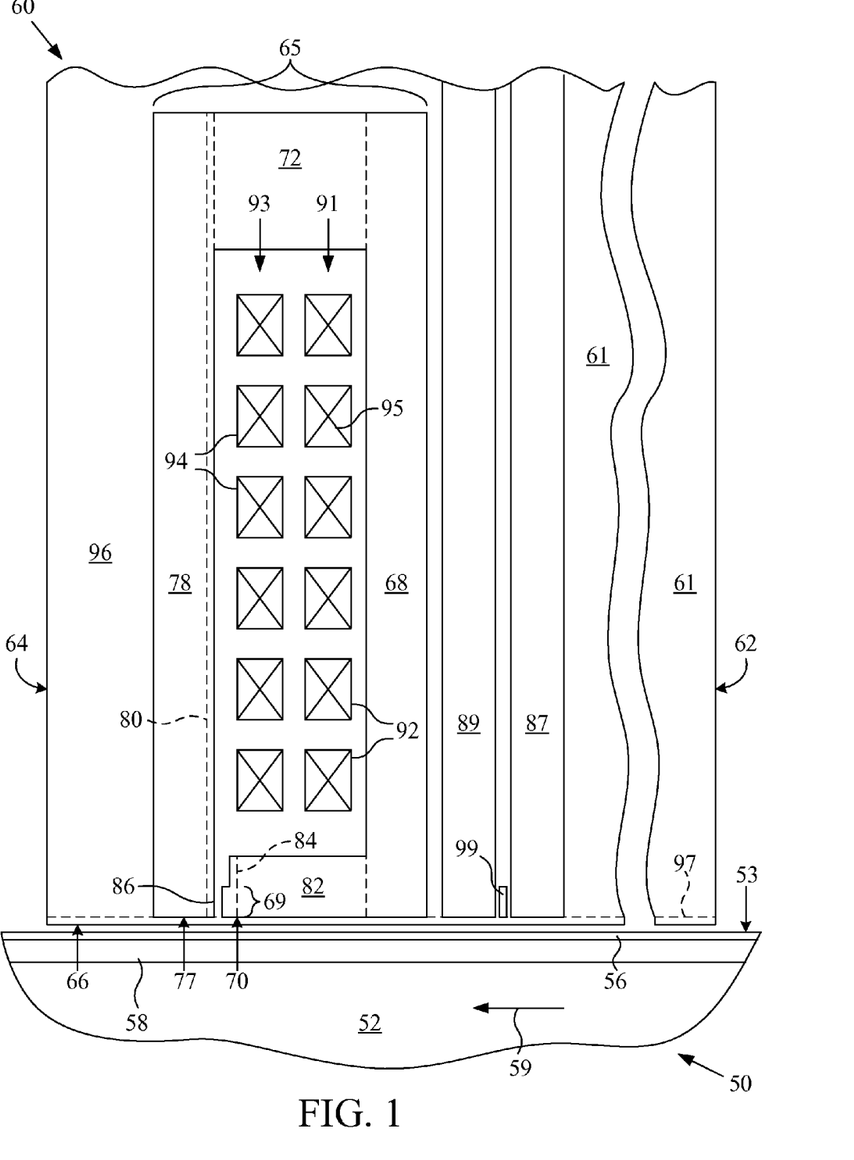
FIG. 1 is a cutaway cross-sectional view of a magnetic head in proximity to a relatively moving medium, the head including a pedestal with a high magnetic saturation layer adjoining a write gap and defining a throat height.

FIG. 1 is a cutaway cross-sectional view of a magnetic head 60 in proximity to a relatively moving medium 50. The medium 50 includes a substrate 52 over which a seed or texture layer may have optionally been formed, followed by a media layer 58. The media layer 58 may have an easy axis of magnetization that is substantially parallel to a major surface 53 of the medium. Although depicted as a single layer, media layer 58 may be formed of a plurality of layers. A thin, physically hard overcoat 56 separates the media layer 58 from the medium surface 53. The medium 50, which may for example be a rigid disk, is moving relative to the head in a direction shown by arrow 59. The head 60 may be spaced from the medium 50 by a nanoscale air bearing, or the head may be in frequent or continuous contact with the medium during operation. The word nanoscale as used herein is meant to represent a size that is most conveniently described in terms of nanometers, e.g., between about one nanometer and about two hundred nanometers.

The head 60 has a leading end 62, a trailing end 64 and a medium-facing surface 66. A first substantially flat pole layer 68 is disposed in the head and terminates adjacent to the medium-facing surface in a substantially flat surface that forms part of a first pole tip 70. Layer 68 is preferably made of low coercivity, high permeability material, which is sometimes called "soft magnetic" material. A second substantially flat soft magnetic layer 78 includes a high magnetic moment layer 80 and terminates adjacent to the medium-facing surface 66 in a second pole tip 77. The second soft magnetic layer 78 is magnetically coupled to the first soft magnetic layer 68 by a soft magnetic backgap structure 72 in a core region 65 that is removed from the medium-facing surface 66.

Adjacent to the medium-facing surface 66 the second soft magnetic layer 78 is magnetically coupled to the first soft magnetic layer 68 by a soft magnetic pedestal 82, which includes a high magnetic saturation layer 84 that is separated from the high magnetic moment layer 80 by a nanoscale nonferromagnetic gap 86. High magnetic saturation layer 84 may include a thicker portion disposed adjacent to the medium-facing surface 66 and a thinner portion disposed further from the medium-facing surface 66, the thicker portion defining a throat height 69 for the head. The soft magnetic structures 68, 72, 78, 80, 82 and 84 of the head 60 may have a permeability of at least about eight hundred, while layers 80 and 84 may also be formed of a high magnetic moment material, e.g., having a magnetic saturation of at least twenty kiloGauss.

A first electrically conductive coil layer 91 spirals around the core region 65 and includes a plurality of coil sections 92 that are disposed between the soft magnetic layers 68 and 78 and between the pedestal 82 and the backgap structure 72. A second electrically conductive coil layer 93 similarly spirals around the core region 65 and includes a plurality of coil sections 94 that are disposed between the soft magnetic layers 68 and 78 and between the pedestal 82 and the backgap structure 72. The current in the coil sections 92 and 94 is flowing in substantially parallel directions, as illustrated by cross marks 95 that indicate current flowing away from the viewer and into the page. The coil layers 91 and 93 each have an end that is connected to receive signals from drive electronics, and the coils are connected to each other with an interconnect section, not shown in this figure. The current flowing in coil sections 92 and 94 induces magnetic flux in the first, second and third soft magnetic structures 68, 72, 78, 80, 82 and 84, which fringes out from the pole tips 70 and 77 adjacent to the gap 86 to write a magnetic pattern on the media layer 58.

The throat height 69 is a parameter in controlling how much flux passes between layers 68 and 78 and how much flux is diverted between pole tips 70 and 77, and is preferably less than about one and one-half microns for most embodiments. Extension of the high magnetic saturation layer 84 beyond the throat height 69 provides increased flux for fringing across the gap 86 and writing the media layer 58. Defining the throat height 69 with a pedestal instead of with an apex of the second pole layer 78 provides flexibility in other dimensions, such as a flare point of the second soft magnetic layer 78.

The head 60 also includes a magnetoresistive (MR) sensor 99 sandwiched between first and second soft magnetic shield layers 89 and 87. The MR sensor 99 can be any sensor that utilizes a change in resistance caused by a change in magnetic field to sense that field, which may be measured as a change in current or voltage across the sensor, including anisotropic magnetoresistive (AMR) sensors, spin-valve (SV) sensors, spin-tunneling (ST) sensors, giant magnetoresistive (GMR) sensors and colossal magnetoresistive (CMR) sensors. Other magnetic sensors, such as optical sensors, can alternatively be employed to sense magnetic fields from the medium. A thin hard coating 97 formed for example of diamond-like carbon (DLC), silicon carbide (SiC), tetrahedral amorphous carbon (ta-C) or the like protects the MR sensor 99 from corrosion or other damage, the coating forming at least part of the medium-facing surface 66.

The MR sensor 99 is disposed adjacent to a substrate 61 on which the aforementioned thin film layers of the head 60 have been formed. The substrate 61 may extend much further between the first shield 87 and the leading end 62 than the distance between the first shield and the trailing end 64, and may be formed of any appropriate substrate material known in the art of magnetic heads, such as alumina, silicon, alumina-titanium-carbide, ferrite, etc.

In one embodiment, head 60 may be configured for perpendicular recording by deleting pedestal 82 and high magnetic saturation layer 84, and terminating layer 78 at least one and one-half microns from the medium-facing surface, to avoid overwriting the signal from layer 84.

Figure 2:
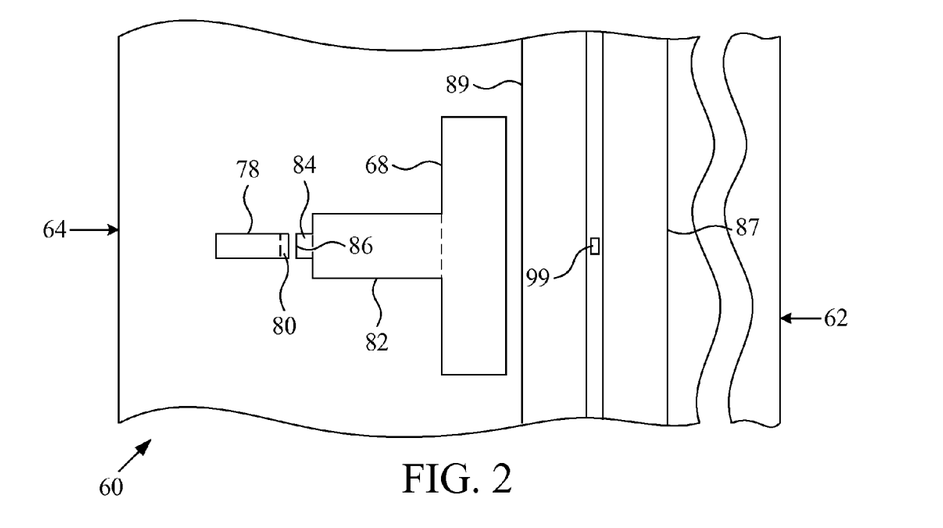
FIG. 2 is a cutaway view of the head of FIG. 1 as seen from the medium.

FIG. 2 is a cutaway view of the head 60 of FIG. 1 as seen from the medium, looking through the thin transparent coating 97 of the medium-facing surface 66, which is therefore not evident in this figure. In this embodiment, layers 78, 80 and 84 have been trimmed for example by ion beam etching (IBE), aligning those layers and defining the track width of nonferromagnetic gap 86. Although not necessarily drawn to scale, layers 78, 80 and 84 may have a track-width dimension of approximately one-quarter micron or less, and in one embodiment may have a track width of about one hundred nanometers. Pole layer 78 may measure on the order of one micron in a track-length dimension that is aligned between the leading end 62 and trailing end 64, and may extend up to one micron in the track-width dimension, unless trimmed along with the high magnetic saturation layer 80. Pedestal layer 82 may extend between two and six microns in the track-length dimension, and may extend up to one micron in the track-width dimension, unless trimmed along with the high magnetic saturation layer 84. High magnetic saturation layers 80 and 84 may have a thickness measured in the track length direction of between twenty and five hundred nanometers.

Figure 3:
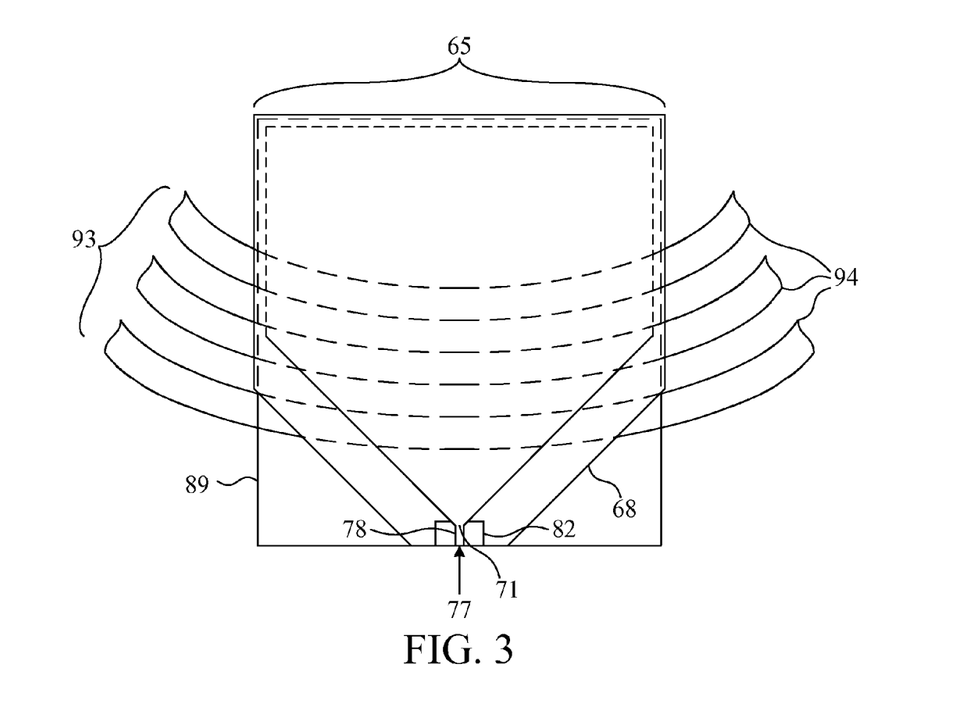
FIG. 3 is a view of the head of FIG. 1 as would be seen looking at the trailing end and focusing on the active elements of the write transducer.

FIG. 3 is a view of the head of FIG. 1 as would be seen looking at the trailing end 64 and focusing on some of the active elements of the write transducer, including ferromagnetic structures 68, 78, 82 and 89, and coil layer 91. Coil sections 82 are cutaway so that entire spiral coil layer 91 is not shown. Only three coil sections may be included in layer 93, and the number of coil layers need not be equal for the two or more layers. For example, in one embodiment layer 91 has four coil sections and layer 93 has three coil sections encircled by the magnetic core. In general, no more than twelve coil sections are disposed between the soft magnetic layers 68 and 78 and between the pedestal 82 and the backgap structure 72. Layer 78 expands from a submicron track width at a flare point 71, to funnel flux through pole tip 77. The ferromagnetic layers 68, 78 and 88 are magnetically coupled in region 65.

Figure 4:
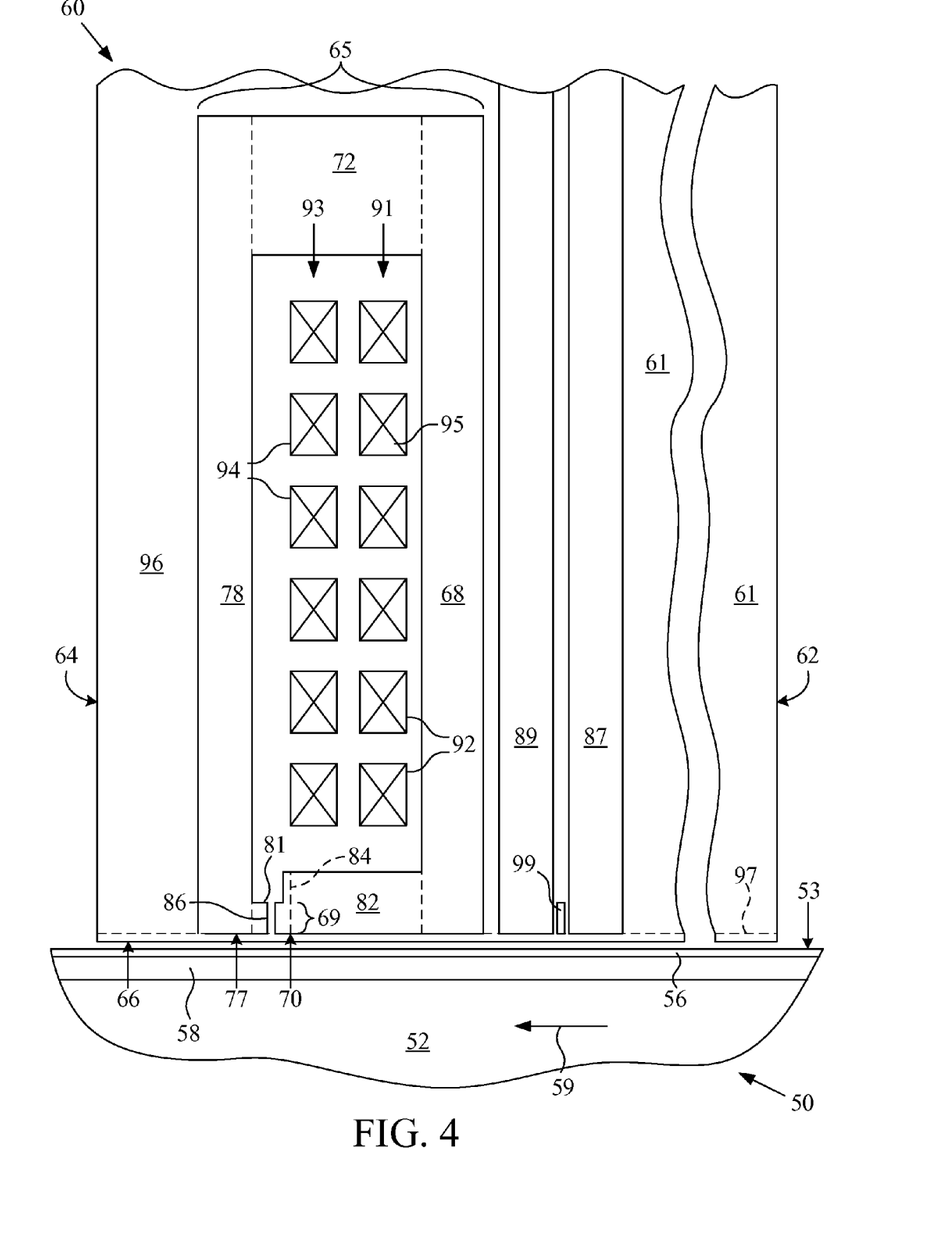
FIG. 4 is a cutaway cross-sectional view of another head in proximity to the moving medium, the head including a pedestal with two high magnetic saturation layers adjoining a write gap and defining a throat height.

FIG. 4 is a cutaway cross-sectional view of a magnetic head 60 and medium 50 that are similar to that shown in FIG. 1, but the head of FIG. 4 has a high magnetic moment layer 81 that extends only as far as the throat height 69 from the medium-facing surface 66. In other words, both high saturation layer 84 and high moment layer 81 have been trimmed at a throat height 69 of about one micron, so that layer 84 can be viewed as forming a pair of self-aligned pedestals. High moment layer 81 has also been formed to a greater thickness than high moment layer 80 of FIG. 1, to reduce off-track writing. High magnetic saturation layer 81 may also optionally be thicker. The self-aligned pedestals help to reduce off track writing, while extension of the high magnetic saturation layer 84 beyond the throat height 69 provides increased flux for fringing across the gap 86 and writing the media layer 58. Defining the throat height 69 with one or two pedestals provides flexibility in other dimensions, such as a flare point of the second soft magnetic layer 78.

Figure 5:
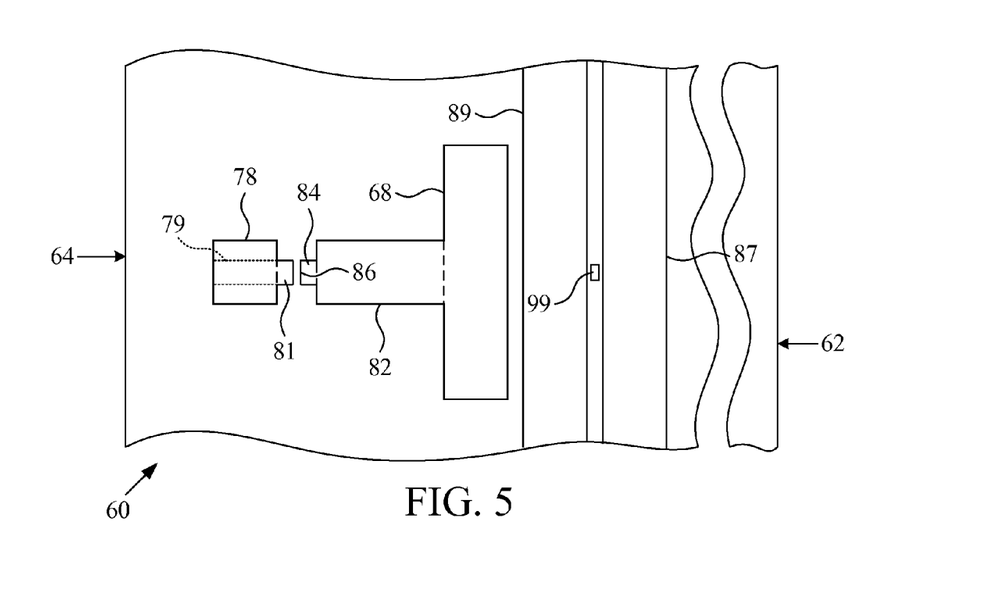
FIG. 5 is a cutaway view of the head of FIG. 4 as seen from the medium.

FIG. 5 is a cutaway view of the head 60 of FIG. 4 as seen from the medium, looking through the thin transparent coating 97 of the medium-facing surface 66, which are therefore not evident in this figure. In this embodiment, 81 and 84 have been trimmed for example by IBE, aligning those layers and defining the track width of nonferromagnetic gap 86. Layer 78 may also be trimmed for example by IBE. Although not necessarily drawn to scale, layers 81 and 84, and optionally layer 78, may have a track-width dimension of approximately one-quarter micron or less, and in one embodiment may have a track width of about one hundred nanometers. Pole layer 78 may measure on the order of one micron in a track-length dimension that is aligned between the leading end 62 and trailing end 64, and may extend up to one micron in the track-width dimension, unless trimmed along with the high magnetic saturation layer 80. Pedestal layer 82 may extend between two and six microns in the track-length dimension, and may extend further in the track-width dimension, unless trimmed with the high magnetic saturation layer 81, as shown by lines 79. For example, pedestal layer 82 may extend as far as magnetic layer 68 in the track width direction, for any part that is not trimmed with layer 84. High magnetic saturation layers 81 and 84 may have a thickness measured in the track length direction of between fifty and five hundred nanometers.

Figure 6:
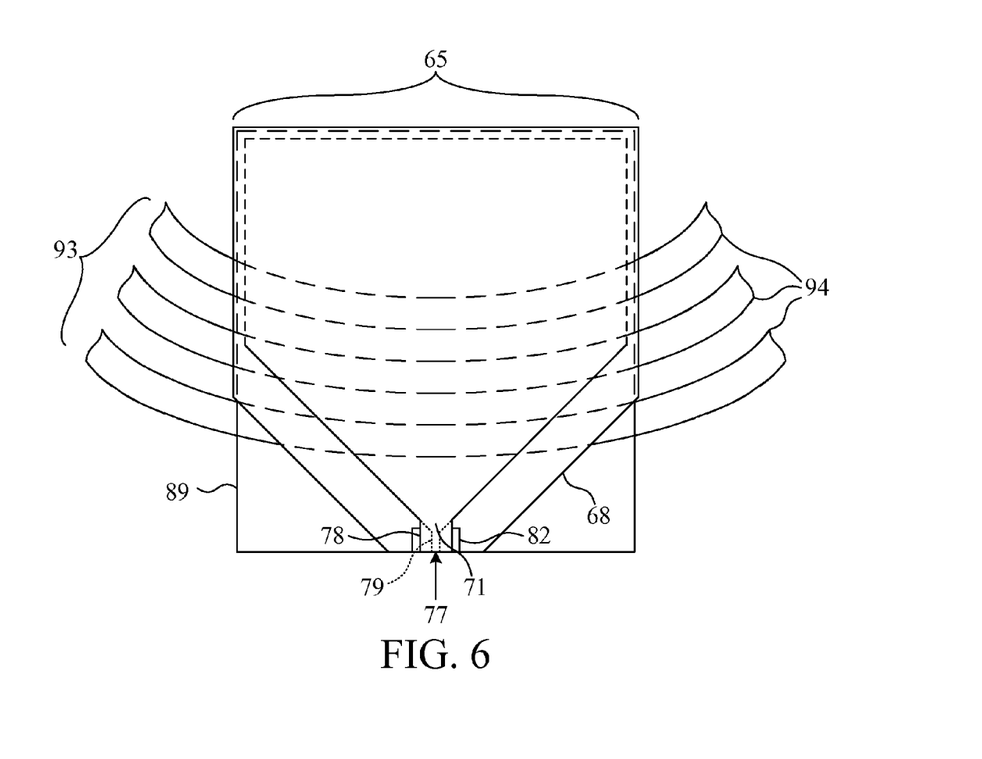
FIG. 6 is a view of the head of FIG. 4 as would be seen looking at the trailing end and focusing on the active elements of the write transducer.

FIG. 6 is a view of the head of FIG. 4 as would be seen looking at the trailing end 64 and focusing on some of the active elements of the write transducer, including ferromagnetic structures 68, 78, 82 and 89, and coil layer 91. Coil sections 94 are cutaway so that entire spiral coil layer 93 is not shown, and only three coil sections are shown for clarity. Layer 78 expands from a submicron track width at a flare point 71, to funnel flux through pole tip 77. The ferromagnetic layers 68, 78 and 88 are magnetically coupled in region 65.

Figure 7:
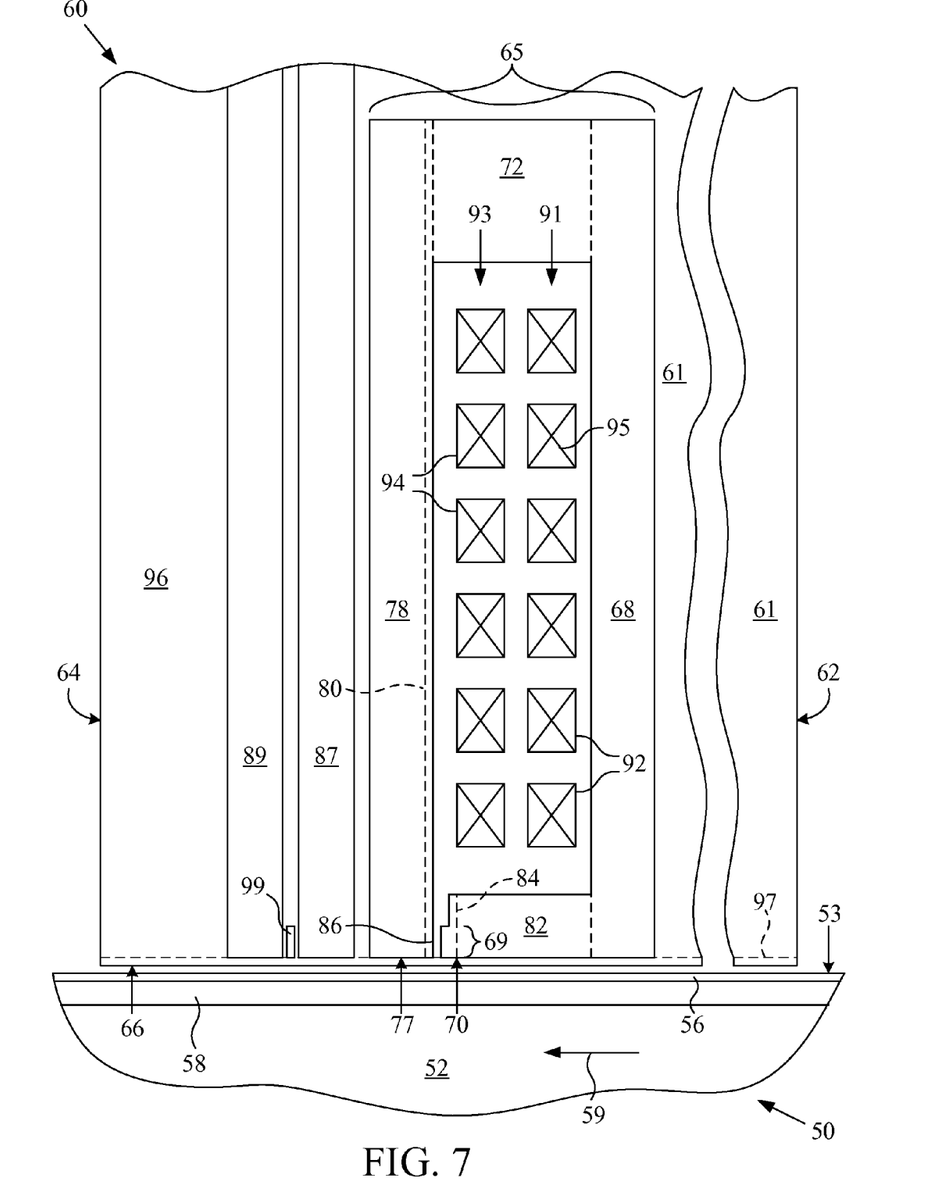
FIG. 7 is a cutaway cross-sectional view of another head in proximity to the moving medium, the head including a MR sensor and a pair of magnetic shields disposed closer than a write transducer to the trailing end.

FIG. 7 is a cutaway cross-sectional view of a magnetic head 60 that is similar to that shown in FIG. 1 except that in FIG. 7 the MR sensor 99 is disposed closer than the inductive write transducer to the trailing end 64. An advantage of this type of configuration is that the coil layers 91 and 93, which may include cured or hardbaked photoresist disposed between their coil sections 92 and 93, are closer to the substrate, which can serve as a heat sink for resistive heat generated by the coil layers 91 and 93. Because cured or hardbaked photoresist has a greater coefficient of thermal expansion than other materials of head 60, resistive heating of the coil layers may otherwise cause bulging of the coil layers that causes a slight protrusion at the medium-facing surface.

Figure 8:
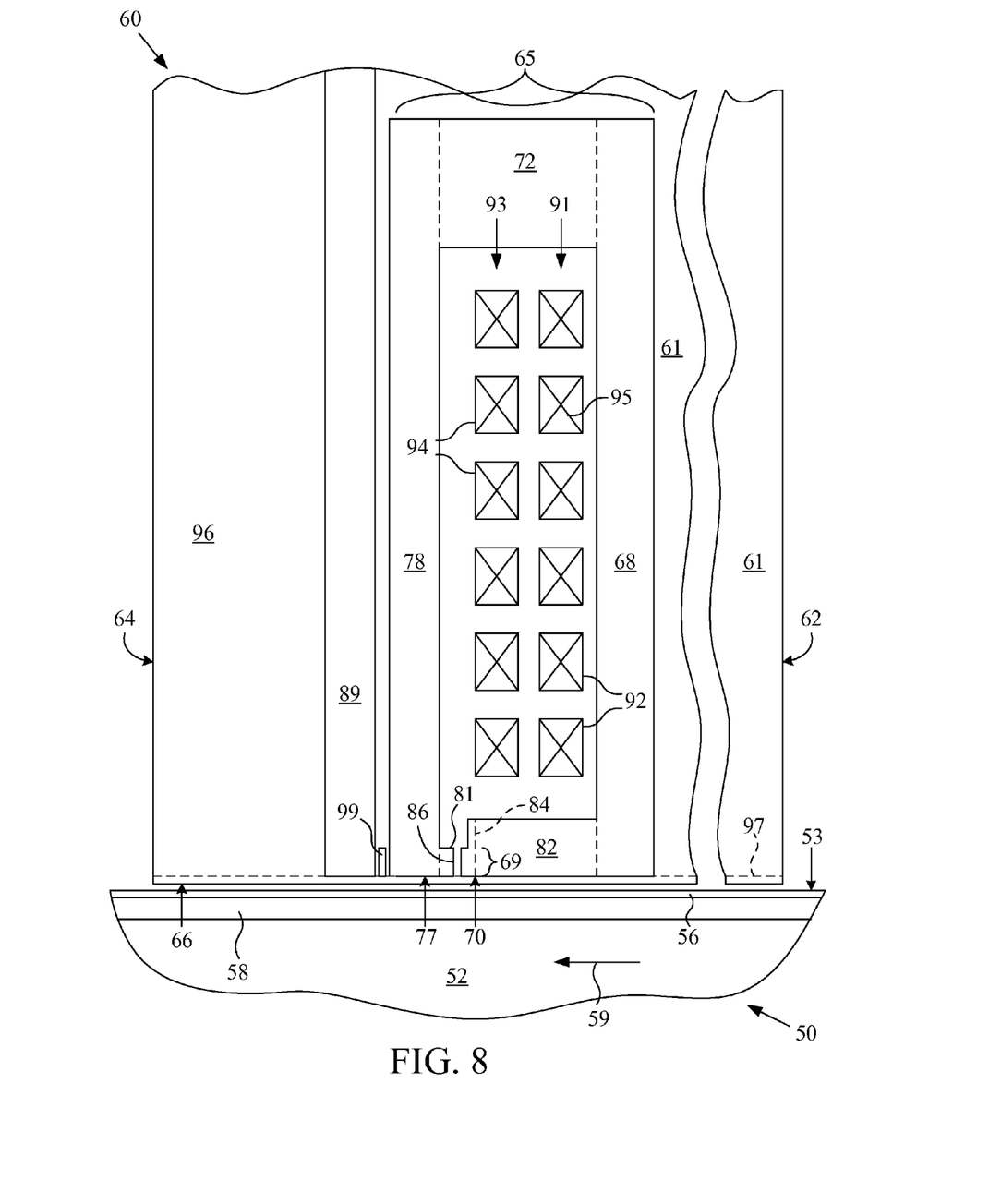
FIG. 8 is a cutaway cross-sectional view of another head in proximity to the moving medium, the head including a MR sensor disposed closer than a write transducer to the trailing end, wherein the sensor has a shield that also functions as a write pole layer.

FIG. 8 is a cutaway cross-sectional view of a magnetic head 60 that is similar to that shown in FIG. 4 except that in FIG. 8 the MR sensor 99 is disposed closer than the inductive write transducer to the trailing end 64. Additionally, in FIG. 8 soft magnetic layer 78 serves as a shield for the MR sensor 99 as well as a pole layer for the inductive write transducer. An advantage of this type of configuration is that the coil layers 91 and 93, which may have cured or hardbaked photoresist disposed between their coil sections 92 and 93, are closer to the substrate, which can serve as a heat sink for resistive heat generated by the coil layers 91 and 93. Because cured or hardbaked photoresist has a greater coefficient of thermal expansion than other materials of head 60, resistive heating of the coil layers may otherwise cause bulging of the coil layers that causes a slight protrusion at the medium-facing surface.

Referring again to FIG. 1, a method for making the head 60 is described. The head 60 is formed in a number of thin-film transducer layers, along with thousands of similar heads, not shown, on the wafer substrate 61, which may be made of alumina-titanium-carbide, alumina, silicon-carbide, ferrite or other known materials. Atop the wafer substrate 61 the first soft magnetic shield layer 87 is formed, for example by window frame plating, either directly on the substrate or atop a seed layer, not shown. After completion of processing, first shield layer 87 may have a thickness of about one or two microns, a height measured from the medium-facing surface of about thirty microns and a width of about ten or twenty microns, for example.

An alumina or other dielectric layer is then deposited and lapped to form a coplanar surface with the first shield layer 87. A first nanoscale read gap layer of nonmagnetic, electrically insulating material is formed on the shield layer, followed by the magnetoresistive (MR) sensor 99. A second nanoscale read gap layer of nonmagnetic, electrically insulating material is then formed between the MR sensor and the second soft magnetic shield layer 89. The MR sensor 99 may be electrically connected to the shield layers 87 and 89 in some embodiments, such as spin-dependent tunneling sensors.

The second shield layer 89 is formed, for example by window frame plating, to a thickness after lapping of about one or two microns and a width of about ten or twenty microns, for example. The second shield layer 89 may have a height that is about equal to that of the pole layers 68, 78, 88 and 89, or about ten microns in this embodiment after completion of fabrication, or the shield layer may have a much greater height. After fabricating the second shield layer 89 another dielectric layer is formed to a thickness that may preferably be about one micron or less, upon which pole layer 68 is then formed, again by window frame plating or other known techniques followed by a first section of soft magnetic backgap structure 72 and pedestal 82.

After blanketing with alumina and polishing to expose the soft magnetic sections 72 and 82, another section of backgap structure 72 and pedestal 82 are formed, and electrically conductive coil layer 91 is formed, for example by separate frame plating procedures. First coil layer 91 may be formed of copper, gold, aluminum, tungsten or other electrically conductive materials. Coil layer 91 is formed in a spiral pattern with winding sections 92 substantially parallel to the medium-facing surface 66 in a region adjacent to pole layer 68. Coil layer 91 may have a thickness on the order of one micron, and winding sections 92 may have a rectangular cross-section of about one micron in thickness by one and one-half microns in height in one embodiment, with a distance between winding sections 92 of about one micron. The distance of the coil layer 91 from the media-facing surface 66 may be in a range between about two microns and six microns in this embodiment.

After polishing the coil layer 91 an electrically conductive interconnect is formed, followed by an alumina layer or other dielectric layer that is formed to a thickness that may be between less than one micron and two microns, after lapping that exposes the interconnect portion. Another section of backgap structure 72 and backgap structure 82 is also formed at about this time.

The second electrically conductive coil layer 93 may then be formed, for example by frame plating of copper, gold, aluminum, tungsten or other electrically conductive materials. A central coil section 82 is connected with the electrically conductive interconnect. Coil layer 93 may have a thickness on the order of one micron, and winding sections 84 may have a rectangular cross-section of about one micron in thickness by one and one-half microns in height in one embodiment, with a distance between winding sections 84 of about one micron. Coil layers 91 and 93 are connected to the electrically conductive interconnect so that current flows in the direction indicated in FIG. 1. Coil sections 94 may be separated from each other primarily by cured photoresist, with an alumina or other dielectric layer deposited over and around the coil layer and polished.

In one embodiment coil sections 92 and 94 may each have cross-sectional dimensions of 0.7 micron in thickness and 1.7 microns in height measured perpendicular to the medium-facing surface 66. In this embodiment, with six or fewer coil sections 92 and 94 that are disposed between pole layers 68 and 78, those pole layers may have a height measured perpendicular to the medium-facing surface 66 of ten microns or less. A yoke height of this embodiment, which is essentially the distance of pole layers 68 and 78 between pedestal 82 and backgap structure 72, may be 7.7 microns or less, reducing the self-inductance of the magnetic core and affording high-frequency (high-data-rate) operation.

In an embodiment like that shown in FIG. 7, coil sections 92 and 94 may each have cross-sectional dimensions of 1.0 micron in thickness and 1.2 microns in height measured perpendicular to the medium-facing surface 66. In this embodiment, with six or fewer coil sections 92 and 94 that are disposed between pole layers 68 and 78, those pole layers may have a height measured perpendicular to the medium-facing surface 66 of eight microns or less. A yoke height (sometimes called a "yoke length") of this embodiment, which is essentially the distance of pole layers 68 and 78 between pedestal 82 and backgap structure 72, may also be 6.4 microns or less, further reducing the self-inductance of the magnetic core and affording high-data-rate operation. To reduce separation between the write gap 86 and the MR sensor 99, the write gap may be located closer than the MR sensor to the leading end 62.

High magnetic saturation layer 84 is then formed, and another section of backgap structure 72 may be formed at the same time by the same material, or in a separate step and with a different material. High magnetic saturation materials, also called high magnetic moment materials, that may be used to form layer 84 include FeN and FeN based alloys, predominantly iron NiFe, CoFe and related alloys, such as CoFeN, etc. High magnetic saturation layer 84 is preferably formed by sputtering or other physical vapor deposition (PVD) techniques, although electroplating may be possible with certain materials. High magnetic saturation layer 84 is first formed to match the track width and height of pedestal 82, either by electroplating or by PVD followed by trimming. High magnetic saturation layer 84 is then trimmed to define the throat height 69 by carefully timed trimming that thins part of that layer 84. An alumina or other nonferromagnetic layer is then deposited to fill the thinned area. High magnetic saturation layer 84 may have a thickness in a first portion of between 50 nanometers and one-half micron, and a thickness in a second portion of between 20 nanometers and one-quarter micron, the first portion being disposed closer than the second portion to the medium-facing surface.

As a more detailed example, layer 84 may be formed by first sputtering predominantly ironCoFeN (e.g., $CO_{29}Fe_{70}N_1$ or $CO_{35}Fe_{64}N_1$), followed by creation of a bilayer photoresist mask that covers what will be the thicker portion of layer

84, and an IBE is performed that thins the exposed portion. Alumina is then sputter-deposited to fill the region of layer 84 that was thinned by IBE, followed by lift-off of that mask and the alumina that is atop the mask by agitated solvent.

The nanoscale nonferromagnetic gap 86 is then formed of insulating material such as alumina, silicon dioxide or the like, or conductive material such as tantalum, chromium, nickel-chromium or nickel-niobium. Metals such as tantalum, chromium, nickel-chromium or nickel-niobium, which may be amorphous, may offer favorable surfaces for forming and trimming high moment layer 80 atop the gap 86.

The flatness of layers 86 is also advantageous in forming high quality magnetic material layers 80, as opposed to sometimes porous layers found in curved apex regions of a trailing pole layer. Photolithographic accuracy is also improved with the flat top pole 78, improving both electroplating and trimming tolerances, providing a much smaller track width.

High magnetic saturation layer 80 is then preferably formed by PVD such as sputtering of materials FeN and FeN based alloys, predominantly iron NiFe, CoFe and related alloys, such as CoFeN, etc. For the embodiment shown in FIG. 1, layer 80 may have a thickness of between 20 nanometers and one-half micron, and may extend the length of the yoke to meet backgap structure 72. For the embodiment shown in FIG. 4, layer 81 may have a thickness of between 50 nanometers and one-half micron, and may terminate at throat height 69. In embodiment illustrated in FIG. 1, the high magnetic saturation layer 80 may serve as a seed layer for layer 78, which may be electroplated for example of permalloy, after which layer 78 serves as a mask during IBE that defines the track width of layers 78, 80, 84 and optionally 82. In the embodiment illustrated in FIG. 4, the throat height 69 has not been formed prior to the gap 86 formation, and is instead formed after deposition of high magnetic saturation layer 80 and prior to seeding and electroplating of layer 78. Also, for the situation in which layer 81 is formed to the throat height 69, layer 78 may terminate further than layer 81 from the medium-facing surface 66, for example by about one-half micron. The track width of layers 80 and 84 can be formed after layer 78 has been formed, which can serve as a mask during track-width trimming. In any case, pole tips 70 and 77 can be self-aligned and the gap 86 may have a track-width of 0.26 microns or less. Also, trimming a metallic gap 86 during throat height 69 trimming in either case prevents eddy currents from developing over a large surface area of electrically conductive gap material, further enhancing high-frequency operation.

Ferromagnetic layer 78 is formed, along with an optional electrically conductive interconnect for the situation in which coil layer 93 is electrically connected at the trailing end 64 as opposed to a top or side surface of the head 60, for example by separate frame plating steps. The soft magnetic layer 78 has a thickness after lapping and track width trimming that may be about one or two microns, extends about eight to ten microns from the medium-facing surface 66, for example. The ferromagnetic layer 78 has a tapered width that funnels magnetic flux to the pole tip 77, the width ranging from about ten microns distal to the media-facing surface 66 to less than one micron, e.g., 0.2 micron adjacent to the pole tip 77.

A protective coating of dielectric material such as alumina or DLC is then formed on ferromagnetic layer 78, to form the trailing end of the head 60. Electrical connections may also be formed to provide electrical contacts either on the trailing end or on a back surface of the head disposed opposite to the media-facing surface 66. Similar electrical leads, not shown, extend from the MR sensor 99 to provide additional electrical contacts either on the trailing end 66 or the back surface.

After forming the protective coating to create the trailing end 64, the wafer substrate 61 and attached thin film layers are diced to form rows of heads, as is known in the art, and the medium-facing surface is formed. The protective coating 97 of hard dielectric material such as DLC, ta-C, SiC or the like is formed. The rows are then divided into individual heads that are attached to suspensions for positioning adjacent to disks in drive systems.

The above described heads in combination with longitudinal media having a coercivity of 5000 oersted can produce a write field in the media of 10650 oersted, with a write gap thickness of 100 nanometers and track width of 0.26 micron, reduced side writing, and high-data-rate (at least one gigahertz) operation.

What is claimed is:

1. A magnetic head for writing information on a relatively-moving medium, the head having a leading end, a trailing end and a medium-facing surface, the head comprising:

a first substantially flat soft magnetic pole layer disposed in the head adjacent to the medium-facing surface and extending substantially perpendicular to the medium-facing surface;

a second substantially flat soft magnetic pole layer disposed in the head adjacent to the medium-facing surface and oriented substantially parallel to the first soft magnetic layer, the second pole layer spaced greater than one micron from the first pole layer and magnetically coupled to the first pole layer in a core region removed from the medium-facing surface;

a soft magnetic pedestal that adjoins the first substantially flat soft magnetic pole layer adjacent to the medium-facing surface;

a first high magnetic saturation layer that adjoins the soft magnetic pedestal;

a second high magnetic saturation layer that adjoins the second substantially flat soft magnetic pole layer and is separated from the first high magnetic saturation layer by a nanoscale nonferromagnetic gap, the first high magnetic saturation layer having a first throat height and the second high magnetic saturation layer extending from the medium-facing surface only to a second throat height, wherein the first and second throat heights are within about one and one-half microns from the medium-facing surface and are essentially equal; and at least one coil layer disposed between the first substantially flat soft magnetic pole layer and the second substantially flat soft magnetic pole layer.

2. The magnetic head of claim 1, further comprising a magnetoresistive sensor.

3. The magnetic head of claim 2, wherein the magnetoresistive sensor is separated from the first substantially flat soft magnetic pole layer by a soft magnetic shield layer.

4. The magnetic head of claim 2, wherein the magnetoresistive sensor is disposed between the second substantially flat soft magnetic pole layer and a soft magnetic shield layer.

5. The magnetic head of claim 4, wherein the magnetoresistive sensor is within one-quarter micron of the second substantially flat soft magnetic pole layer.

6. The magnetic head of claim 1, wherein the first substantially flat soft magnetic pole layer adjoins a substrate extending a distance from the first substantially flat soft magnetic pole layer to the leading end greater than a distance between the first substantially flat soft magnetic pole layer and the trailing end.

7. The magnetic head of claim 1, wherein the first high magnetic saturation layer comprises a first portion extending from the medium-facing surface only to the first throat height and a second portion extending beyond the first throat height.

8. The magnetic head of claim 7, wherein the first portion of the first high magnetic saturation layer is formed by trimming the first high magnetic saturation layer at the first throat height to produce first and second portions that have identical track-width dimensions and are aligned in the track-width direction.

9. The magnetic head of claim 7, wherein the first portion of the first high magnetic saturation layer is thicker than the second portion.

10. The magnetic head of claim 7, wherein the first portion of the first high magnetic saturation layer has a first thickness of at least fifty nanometers and less than one half of a micron and the second portion has a second thickness at least twenty nanometers and less than one fourth of a micron.

11. The magnetic head of claim 10, wherein the second section is substantially flat with a substantially constant spacing from the second substantially flat soft magnetic layer.

12. The magnetic head of claim 1, wherein a track-width dimension of the first high magnetic saturation layer is less than one-quarter micron.

13. The magnetic head of claim 1, wherein a track-width dimension of the first high magnetic saturation layer is less than 100 nanometers.

14. The magnetic head of claim 1, wherein the soft magnetic pedestal has a track-width dimension identical to the first high magnetic saturation layer.

15. The magnetic head of claim 1, wherein the second substantially flat soft magnetic pole layer has a flare point beyond the second throat height.

16. The magnetic head of claim 1, wherein the first high magnetic saturation layer and the second high magnetic saturation layer each have a magnetic saturation of at least twenty kiloGauss.

* * * * *